(12) United States Patent
Mores et al.

(10) Patent No.: US 9,409,643 B2
(45) Date of Patent: Aug. 9, 2016

(54) HELICOPTER WITH CROSS-FLOW FAN

(71) Applicant: AIRBUS HELICOPTERS DEUTSCHLAND GMBH, Donauworth (DE)

(72) Inventors: Sebastian Mores, Munich (DE); Alessandro D'Alascio, Haar (DE); Marius Bebesel, Augsburg (DE)

(73) Assignee: AIRBUS HELICOPTERS DEUTSCHLAND GmbH, Donauworth (DE)

( * ) Notice: Subject to any disclaimer, the term of this patent is extended or adjusted under 35 U.S.C. 154(b) by 22 days.

(21) Appl. No.: 14/284,956

(22) Filed: May 22, 2014

(65) Prior Publication Data

US 2015/0191245 A1    Jul. 9, 2015

(30) Foreign Application Priority Data

May 30, 2013    (EP) ..................................... 13400011

(51) Int. Cl.
*B64C 27/82*    (2006.01)
*B64C 27/06*    (2006.01)

(52) U.S. Cl.
CPC ............... *B64C 27/82* (2013.01); *B64C 27/06* (2013.01); *B64C 2027/8245* (2013.01)

(58) Field of Classification Search
CPC  B64C 27/06; B64C 2027/8245; B64C 15/14; B64C 2027/8254; B64C 23/005; B64C 27/82; A63H 27/12
USPC .................................................... 244/17.19
See application file for complete search history.

(56) References Cited

U.S. PATENT DOCUMENTS

| 2,486,272 | A |   | 10/1949 | Gazda |          |
|-----------|---|---|---------|-------|----------|
| 3,807,662 | A | * | 4/1974  | Velazquez | ................ 244/17.19 |
| 4,660,785 | A | * | 4/1987  | Munski | ................... 244/17.19 |
| 5,240,205 | A | * | 8/1993  | Allongue | ................ 244/17.19 |
| 5,269,654 | A | * | 12/1993 | Chapman | .................... 416/120 |

(Continued)

FOREIGN PATENT DOCUMENTS

| EP | 2511177  | 10/2012 |
|----|----------|---------|
| GB | 2316374  | 2/1998  |

(Continued)

OTHER PUBLICATIONS

Extended European Seach for EP 13400011.6, Completed by the European Patent Office, Dated Nov. 4, 2013, 6 Pages.

*Primary Examiner* — Tien Dinh
*Assistant Examiner* — Vicente Rodriguez
(74) *Attorney, Agent, or Firm* — Brooks Kushman P.C.

(57) ABSTRACT

A helicopter with a fuselage (4), at least one engine, a roll axis, at least one main rotor, and at least one housing (2) mounted to said fuselage (4). An air inlet (8) and an air outlet (7) are provided along at least a part of a circumference of the at least one housing (2), said air inlet (8) and said air outlet (7) being formed by angularly offset and separate gaps between an inside segment (33) and an outside segment (34) essentially extending respectively longitudinally in direction of said roll axis. At least one rotatable compressor (1) with a plurality of airfoil blades (6) is provided radial inside said at least one housing (2) between said air inlet (8) and said air outlet (7), said at least one rotatable compressor (1) being drivable by said at least one engine about a fan axis (5) and each chord of said airfoil blades (6) is essentially radial oriented with regard to said fan axis (5).

19 Claims, 3 Drawing Sheets

(56) References Cited

U.S. PATENT DOCUMENTS

2012/0160955 A1  6/2012  Seifert
2013/0119186 A1* 5/2013  Heid .......................... 244/17.21

FOREIGN PATENT DOCUMENTS

GB    2346348    8/2000
GB    2405624    3/2005

* cited by examiner

HELICOPTER WITH CROSS-FLOW FAN

CROSS REFERENCE TO RELATED APPLICATION

This application claims priority to European patent application No. EP 13 400011.6 filed May 30, 2013, the disclosure of which is incorporated in its entirety by reference herein.

BACKGROUND OF THE INVENTION (1) Field of the Invention

The invention relates to helicopters and particularly to helicopters with an anti-torque device according to the preamble of claim 1.

(2) Description of Related Art

A configuration of a current rotary wing flying machine, e.g. a helicopter, comprises a main rotor, which in operation transmits a torque around a yaw axis of the helicopter. In operation this torque is countered by an empennage with typically an anti-torque device, such as a tail rotor, a shrouded tail rotor, i.e. a so called Fenestron, and a vertical fin. Exception made for the fin, all other anti-torque devices need power in order to provide this anti-torque needed for a helicopter operating properly.

Additionally a typical helicopter configuration needs a horizontal stabilizer for pitch stability by generating negative lift in order to keep the helicopter fuselage in a proper, horizontal position during a typical forward flight. In additional flight conditions, such as push-over, pull-out, etc., the horizontal stabilizer provides sufficient static and dynamic stability. The typical horizontal stabilizer has a fixed incidence angle, hence the force provided by the horizontal stabilizer cannot be changed by the pilot during flight. Therefore, the minimum drag fuselage attitude might not be fully achieved.

Gathering the information of the anti-torque designs of the state of the art, the following problems occur:

Fixed vertical and horizontal stabilizing surfaces only provide forces in said fixed directions;

Fixed vertical and horizontal stabilizing surfaces do not provide any additional propulsive force;

Open tail-rotors are a potential danger for humans and can be damaged by foreign objects;

The rotating devices cannot be easily changed in diameter without having major changes and re-designs of the entire helicopter.

Cross-Flow Fans with blades arranged to a torus-like configuration are known from the heating, ventilating and air conditioning field, providing an airflow passing the blades crosswise. Cross-Flow Fans are characterized by one dominant dimension, namely small in diameter and as long as needed.

The document GB 2316374 describes a cross-flow fan integrated in a lifting member, e.g. a wing, in order to create lift for an aircraft's airfoil.

The document GB 2346348 A describes a cross-flow fan integrated into a lifting member with additionally a movable lip in the ingestion area.

The document GB 2405624 A describes a cross-flow fan which is integrated into the rear section of an airfoil in order to control the flow around the airfoil. Additionally the document GB 2405624 A describes an enclosed housing which can be closed for cruise flight and opened for high-lift conditions as needed during take-off.

The document US 2012/0160955 A1 describes a hybrid rotor system for an aircraft which produces lift and thrust in order to propel an aircraft. This hybrid rotor system comprises a magnus rotor, a transverse flow rotor, i.e. a so called cross-flow fan, and a guide mechanism. In general US 2012/0160955 A1 relates only to aircrafts without an additional rotor system, so called cyclogyros, that pulls maximal airflow through both of propulsion and lifting surfaces. A cylindrical radial turbine is embedded in the wing with its axis parallel to the wing and leaving about ⅔ of the diameter exposed above the top side of the wing's length just after the leading edge. This increases the velocity of the airflow across the wing's upper surface beyond that of the forward motion of the aircraft. Consequently the wing of US 2012/0160955 A1 has lift at slow speeds where another wing would stall.

The document US 2013/0119186 A1 describes a helicopter with a fuselage and a tail boom, said helicopter being provided with a main rotor that rotates in operation about a rotation axis and, thus, produces a torque which acts on the fuselage. A cross-flow fan with a housing and a rotor is provided, said rotor being mounted in the housing, wherein the cross-flow fan is arranged on the tail boom of the helicopter such that it produces a thrust effect during operation which compensates for the torque produced by the main rotor. The housing comprises an air inlet and an air outlet, which is arranged at a position that is diametrically opposed to a position of the air inlet. The cross-flow fan produces an air flow that is perpendicular to its rotation axis.

BRIEF SUMMARY OF THE INVENTION

It is an object of the invention to provide an improved helicopter and particularly it is an object of the invention to provide a helicopter with an improved anti-torque device, to counter-act the main rotor's torque resulting on the fuselage.

The solution is provided with an improved helicopter and particularly with a helicopter with an improved anti-torque device with the features of claim 1 of the invention.

According to the invention a helicopter comprises a fuselage, at least one engine, a roll axis and at least one main rotor mounted to said fuselage and drivable connected to said at least one engine about a yaw axis essentially perpendicular to said roll axis. At least one housing of a cross flow fan is mounted to said fuselage, said at least one housing extending longitudinally essentially in direction of said roll axis with an offset relative to said yaw axis. Said at least one housing is at least partly pivotable about its longitudinal axis. Said at least one housing is provided with an air inlet for incoming air and an air outlet for outgoing air along at least a part of the at least one housing's circumference respectively in direction of said roll axis. Said air inlet and said air outlet form angularly offset and separate gaps in the housing.

At least one compressor of the cross flow fan is provided radial inside said pivotable housing between said air inlet and said air outlet, said at least one compressor being drivable by said at least one engine about a fan axis essentially parallel with said roll axis. Each of said at least one compressor comprises a plurality of airfoil blades, i.e. designed by means of aerodynamically optimized airfoils, arranged on a ring around said fan axis and each chord of said airfoil blades is essentially radial oriented with regard to said fan axis. Said at least one rotatable compressor and said at least one housing are preferably configured to produce, in operation of said at least one rotatable compressor, lift oriented in the region of the air inlet into a direction opposite to a flow direction of the incoming air due to ingestion of said incoming air into said compressor, and lateral thrust oriented in the region of the air outlet into a direction opposite to a flow direction of the outgoing air for anti-torque.

According to an advantage of the invention the cross-flow fan provides first of all anti-torque for the helicopter as a consequence of the angular offset of the separate gaps in the housing for said air inlet and for said air outlet. Said angular offset preferably varies from 10° to 90° for an angle measured between a side from the fan axis to a lateral inlet delimitation of the inlet and a side to a lateral outlet delimitation of the outlet next to said lateral inlet delimitation of the inlet. Said cross-flow fan is characterized by one dominant dimension, namely relative to the overall dimensions of the helicopter small in diameter, while as long as needed.

Any fluid, e.g. air, entering the cross-flow fan at the inlet passes crosswise to the fan axis along the radial oriented airfoil blades towards the outlet, providing two consecutive compressions, one after the fluid having entered and another one after having left the ring. The inventive cross-flow fan comprises the compressor, rotating around its fan axis and the special housing built in close contact around the radial outer tips of the airfoil blades of the compressor. The housing in close contact with the radial outer tips of the airfoil blades of the compressor prevents the fluid from trespassing radially the airfoil blades not in line with either the inlet or the outlet.

The compressor comprises the given number of small aerodynamically shaped airfoil blades, spaced relative to each other in the azimuth direction from the yaw axis. Contrary to classical tail rotors of helicopters creating anti-torque for compensation of the fuselage and the main rotor torque by creating an essentially lateral force, the inventive helicopter with a cross-flow fan allows provision of anti-torque without tail rotor. Further contrary to classical tail rotors of helicopters needing horizontal stabilizers creating forces in the direction of the yaw axis, e.g. negative lift, to balance the fuselage pitch and a vertical fin creating lateral forces perpendicular to a plane of said roll axis and said yaw axis without any further support of helicopter flight performance generally, the inventive helicopter with a cross-flow fan provides support of helicopter flight performance in general. The provision and the arrangement of the cross-flow fan of the inventive helicopter improve performance in several ways, namely by providing:

An anti-torque device (lateral thrust direction);
A lift device (vertical thrust direction);
A combination of said anti-torque and said lift device, i.e. both lateral and vertical thrust direction;
Additional thrust due to the so called "Coanda effect" resulting outside the housing; and/or
Additional thrust due to a diffusor type air outlet of the housing;
Additional lift due to air inlet substantially directed towards the main rotor plane.

Anti-torque and lift is provided to the inventive helicopter by means of the cross-flow fan without a tail rotor, without a fin and without horizontal stabilizers.

According to a preferred embodiment of the invention by remotely controlling the angular position of the gaps in the housing by means of at least partly rotating the housing around the fan axis the direction of the compressed airflow, directed normally to the fan rotation-axis, can be rotated around this fan axis providing thrust components additional to the thrust providing anti-torque. Hence the thrust vector is freely rotatable around the fan rotation-axis. An advantage of the cross-flow fan is that the direction of any fluid entering the cross-flow fan housing is not important, since the cross-flow fan "sucks" the fluid into the housing as necessary.

According to a further preferred embodiment of the invention the outlet of the housing is designed as a diffusor in order to recover pressure out of kinetic energy, transmitted to the air flow by the cross-flow fan. Generally the cross-flow fan's compressor creates high output velocities, yet, due to the diffusor, this velocity is converted into increased static pressure.

According to a further preferred embodiment of the invention the compressor of the cross-flow fan is driven by an output shaft from a main gear box driven by the at least one engine or the compressor of the cross-flow fan is driven electrically. Driving the compressor electrically would increase performance since the driving speed can be adjusted individually thus controlling the thrust provided by the cross-flow fan. Combining the controlled thrust from the compressor with the adjustable thrust vectoring by means of the pivoting housing leads to a powerful force and anti-torque device.

According to a further preferred embodiment of the invention the cross-flow fan system can be used to drive further auxiliary forward propelling devices, e.g. propeller, etc. with a rotation axis coaxial with the fan axis. With the compressor of the cross-flow fan used to drive a pusher propeller/ducted fan/radial compressor, the inventive helicopter becomes a compound helicopter.

According to a further preferred embodiment of the invention the housing of the cross-flow fan is split into a front section, an aft section and/or a mid-section, the front section being closest to the yaw axis, the aft section being distal to the yaw axis and the mid-section being between the front section and the aft section, said front section, the aft section and/or the mid-section being separately and independently from each other pivotable about the fan axis.

According to a further preferred embodiment of the invention two cross-flow fans are provided, each with a compressor and a housing. The two cross-flow fans are mounted on the fuselage parallel to each other and preferably symmetric to a midplane defined by said plane of said roll axis and said yaw axis.

According to a further preferred embodiment of the invention the width of the inlet is greater than the width of the outlet for a better efficiency of the compressor.

According to a further preferred embodiment of the invention the angular offset varies from 10° to 90° for an angle measured between a side from the fan axis to a lateral inlet delimitation of the air inlet and a side to a lateral outlet delimitation of the air outlet next to said lateral inlet delimitation of the inlet for further adjustable thrust vectoring.

According to a further preferred embodiment of the invention the angles from the fan axis of the compressor to the lateral inlet delimitations of the air inlet in the azimuth direction relative to the yaw axis vary for the lateral inlet delimitation between 350°+/−50° and between 10°+/−50° to the opposed lateral inlet delimitation with the yaw axis directed to the main rotor corresponding to 0° and the degrees positive in clockwise direction.

According to a further preferred embodiment of the invention the angles from the fan axis of the compressor to the lateral outlet delimitations of the air outlet in the azimuth direction relative to the yaw axis vary on the lateral outlet delimitation between 215°+/−50° and between 255°+/−50° to the opposed lateral outlet delimitation.

Preferred embodiments of the invention are outlined by way of example with the following description with reference to the attached drawings.

DETAILED DESCRIPTION OF THE INVENTION

Figure 1:
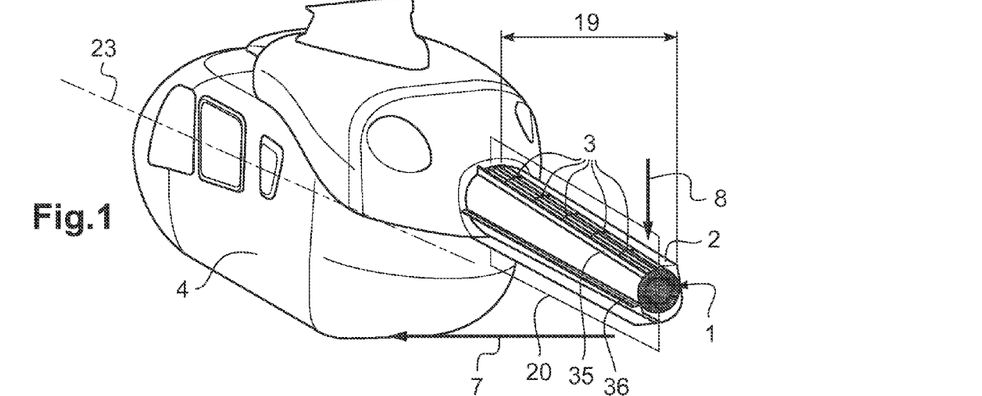
FIG. 1 shows an overall view of a part of a helicopter with a cross flow fan according to the invention.

According to FIG. 1, a helicopter comprises a fuselage 4 with at least one driving unit, e.g. an integrated engine (not shown). The at least one integrated engine drives a main rotor (not shown) via a main gear box (not shown) mounted on top of the fuselage 4 of the helicopter. A rotation axis of the main rotor corresponds to a yaw axis 13 (see FIG. 3) of the helicopter.

Figure 3:
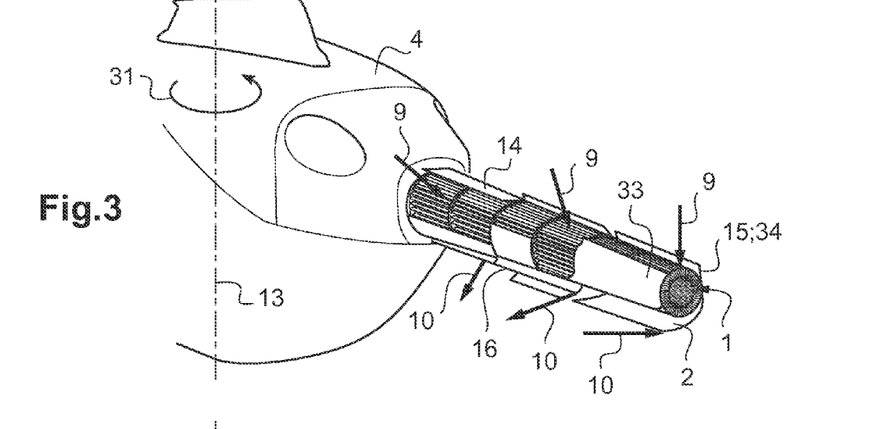
FIG. 3 shows an overall view of the cross flow fan of FIG. 1 in an operating mode.

A housing 2 of a cross flow fan is mounted to an aft region of said fuselage 4 with a roll axis 23 perpendicular to said yaw axis 13. Said housing 2 extends with angular variations of up to +/−15° relative to said yaw axis 13 essentially in direction of a roll axis 23 of the helicopter with an offset defined by a longitudinal extension 19 of the compressor 1 and housing 2 in direction of said roll axis 23 relative to said yaw axis 13.

A helicopter width is defined as the maximum distance between respective left hand and right hand surfaces of the fuselage 4 measured orthogonally to a helicopter mid-plane 20 defined by said roll axis 23 and said yaw axis 13. The present helicopter width is between 1 m-4 m.

An air inlet 8 and an air outlet 7 are provided along a circumference of the housing 4. Said air inlet 8 and said air outlet 7 form angularly offset and separate gaps in the housing's circumference and essentially extend respectively longitudinally in direction of said roll axis. Said angular offset is about 45° of a range of possible 10° to 90° for an angle measured between a side from a fan axis 5 of the compressor 1 to a lateral inlet delimitation 35 of the air inlet 8 and a side from said fan axis 5 to a lateral outlet delimitation 36 of the air outlet 7 next to said lateral inlet delimitation of the inlet 8.

A compressor 1 of the cross flow fan with a plurality of airfoil blades 6 is provided radial inside said housing 2 between said air inlet 8 and said air outlet 7.

Figure 2:
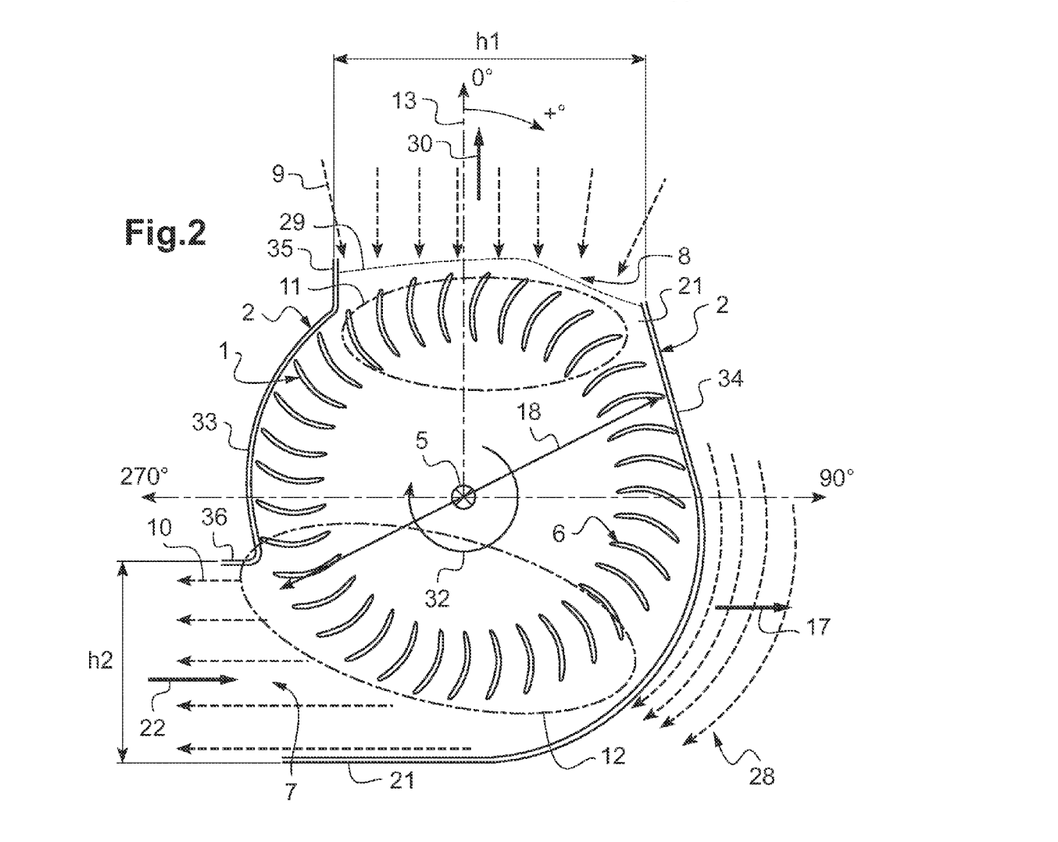
FIG. 2 shows a schematic cross sectional view through the cross flow fan of FIG. 1.

According to FIG. 2 corresponding features are referred to with the references of FIG. 1. The compressor 1 of the cross-flow fan is mounted radially inside the housing 2 for rotation about the fan axis 5. The compressor 1 is drivable by electrical or mechanical means, e.g. the main gear box, about the fan axis 5.

Said airfoil blades 6 provide to the compressor 1 a torus shape with a diameter 18 of around 50% (±45%) of the helicopter width. Said compressor 1 of the cross flow fan is drivable by said integrated engine to rotate about the fan axis 5 essentially coaxial with said roll axis 23. Chords of said airfoil blades 6 are essentially radial oriented with regard to said fan axis 5. A plurality of support rings 3 are provided in the circumference of the compressor 1 along the fan axis 5 of the compressor 1 corresponding to said longitudinal extension 19 of the compressor 1 and housing 2.

The radially arranged airfoil blades 6 radially inside the inlet region 11 point with their respective radial outer tips towards the inlet region 11, providing in between the airfoil blades 6 maximized passages for air 9 coming into the cross-flow fan. The radially arranged airfoil blades 6 radially in line with the outlet region 12 point with their respective radial outer tips towards the outlet region 12, providing in between the airfoil blades 6 maximized passages for outgoing air 10.

The longitudinal extension 19 of the compressor 1 and housing 2 is estimated to be between 10% and 600% of the helicopter width. An inlet opening width h1 is defined by h1=1 (+0.2,−0.95)×compressor diameter 18. The outlet opening width h2 is defined by h2=0.8 (±0.7)×compressor diameter 18 of the cross-flow fan. The inlet opening width h1 is greater than the outlet opening width h2.

The housing 2 is adapted along the fan axis 5 to segments of the torus shape of the compressor 1. The housing 2 is open to form the air inlet 8 in an inlet region 11 pointing with a perpendicular of a geometrical midplane of the air inlet 8 substantially towards the main rotor plane. The housing 2 is open to form the air outlet 7 in a lateral, outlet region 12 pointing with a further perpendicular of its geometrical midplane against the direction of movement of the main rotor in the aft region. An inside segment 33 and an outside segment 34 of the housing 2 cover the compressor 1 on opposed sides between the air inlet 8 and the air outlet 7 of the cross-flow fan to impose a defined flow direction of the air sucked through the compressor 1 for anti-torque.

The angles from the fan axis 5 of the compressor 1 to the lateral inlet delimitations 21, 35 of the air inlet 8 in the azimuth direction relative to the yaw axis 13 vary on one side between 350°+/−50° and between 10°+/−50° to the opposed side with the yaw axis 13 directed to the main rotor corresponding to 0° and the degrees positive in clockwise direction. The angles from the fan axis 5 of the compressor 1 to the lateral outlet delimitations 36, 21 of the outlet 7 in the azimuth direction relative to the yaw axis 13 vary on one side between 215°+/−50° and between 255°+/−50° to the opposed side. If the compressor 1 is driven to rotation, air 9 entering through the air inlet 8 first passes along the airfoil blades 6 in the inlet region 11, for a first compression of the air 9. The incoming air 9 produces lift 30 towards the main rotor plane due to ingestion into the compressor 1. The airfoil blades 6 of the rotating compressor 1 force further compressed air 10 exiting through the air outlet 7 providing substantial lateral thrust 22 for anti-torque. The air outlet 7 is shaped as a diffusor for increase of thrust 22 from the cross-flow fan.

Flaps and/or hatches 21 for enhanced thrust vectoring of the cross-flow fan are provided at the air inlet 8 and at the air outlet 7 of the inside segment 33 and/or the outside segment 34 of the housing 2. The flaps and/or hatches 21 are pivoted by means of joints (not shown) relative to the inside segment 33 and/or the outside segment 34 to modify respectively the effective cross sections of the air inlet 8 and of the air outlet 7 for adjustment of the thrust vector needed.

A FOD (Foreign Object Damage) grid 29 is applied to cover the air inlet 8 and/or the air outlet 7 in order to protect the compressor 1 of the cross-flow fan from foreign objects, e.g. birds, stones, etc. and protect humans from the rotating compressor 1.

Due to the asymmetric transport of air through the rotating compressor 1 air is conveyed around the cross-flow fan housing 2 with a side-effect applied to said air and consequently to the cross-flow fan housing 2. Said side-effect is typical for the cross-flow fan system. Air 28 outside the cross-flow fan's housing 2 flows around the housing 2 creating an additional side force 17 due to the Coanda effect, describing the tendency of a fluid jet to be attracted to any surface the fluid jet is passing along. The Coanda effect can be thought of as an extension of the principle of aerodynamic lift. When a fluid flows past one side of a surface, the fluid pressure is reduced and a force results acting perpendicular to the surface as "lift". The additional side force 17 due to the Coanda effect is supplemental to the lateral thrust 22 for anti-torque from the cross-flow fan.

For additional stiffness of the compressor 1 the fan axis 5 is conceived as an integrated shaft 32 rotating about the rotational axis 5 of the cross-flow fan. The integrated shaft 32 creates additional thrust due to the Magnus effect supporting the previously described cross-flow fan forces 22, 17 and 30.

According to FIG. 3 corresponding features are referred to with the references of FIG. 1, 2. The cross-flow fan antitorque system produces thrust along the entire longitudinal length of the cross-flow fan in order to provide lift and antitorque for the helicopter. To increase the lever for an increased yawing moment 31 at a constant cross-flow fan sideward thrust 22 the housing 2 of the cross-flow fan is split into a front section 14, an aft section 15 and/or a mid-section 16, the front section 14 being closest to the yaw axis 13, the aft section 15 being distal to the yaw axis 13 and the mid-section 16 being between the front section 14 and the aft section 15.

In order to allow adjustment of the respective directions of lift 30 and lateral thrust 22, generated by the entering air 9 and the exiting air 10, the front section 14, the aft section 15 and/or the mid-section 16 of the inside segments 33 and the outside segments 34 of the cross-flow fan housing 2 are separately and independently from each other pivotable about the fan axis 5 for full thrust vectoring capability against yawing moments about the yawing axis 13.

The respective longitudinal extensions of the front section 14, the aft section 15 and the mid-section 16 of the inside segments 33 and the outside segments 34 of the cross-flow fan housing 2 correspond to the distances between two support rings 3 of the compressor 1.

The front section 14 is angularly positioned to provide the air inlet 8 with an angle with respect to its geometrical midplane of approximately 315° and the air outlet 7 with an angle to its geometrical midplane of approximately 225° relative to the yaw axis 13, while the aft section 15 and/or the midsection 16 of the inside segments 33 and the outside segments 34 of the cross-flow fan housing 2 provide an air inlet 8 with a geometrical midplane essentially parallel to the yaw axis 13 and an air outlet 7 with its geometrical midplane with an angle of approximately 90° relative to the yaw axis 13.

Figure 4:
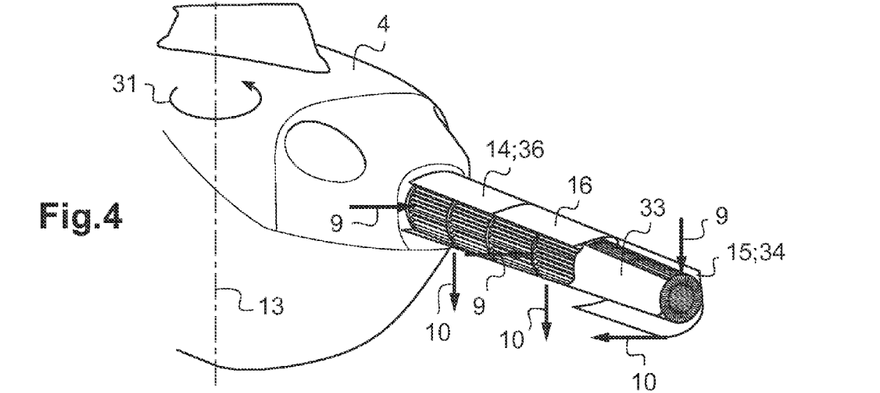
FIG. 4 shows an overall view of the cross flow fan of FIG. 1 in another operating mode.

According to FIG. 4 corresponding features are referred to with the references of FIG. 1-3. The front section 14 and the mid-section 16 of the inside segments 33 and the outside segments 34 of the cross-flow fan housing 2 are angularly positioned for variable thrust vectoring. The air inlet 8 is directed with respect to a geometrical midplane with an angle of approximately 90° relative to the yaw axis 13 and the air outlet 7 essentially parallel to the yaw axis 13, while the aft section 15 of the inside segments 33 and the outside segments 34 of the cross-flow fan housing 2 provide an air inlet 8 essentially parallel to the yaw axis 13 and an air outlet 7 with an angle of approximately 90° relative to the yaw axis 13.

Figure 5:
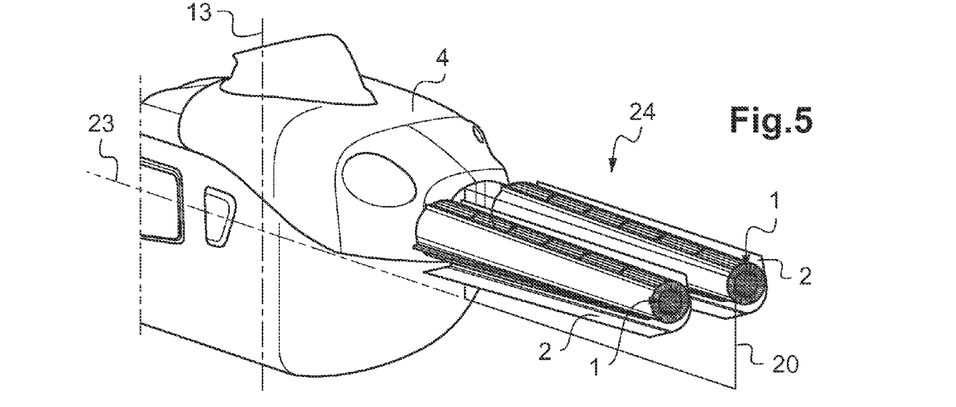
FIG. 5 shows an overall view of a part of a further helicopter with cross flow fans according to the invention.

According to FIG. 5 corresponding features are referred to with the references of FIG. 1-4. Two cross-flow fans 24, each with a compressor 1 and a housing 2, are mounted parallel to each other and symmetric to the midplane 20 on the fuselage 4.

Figure 6:
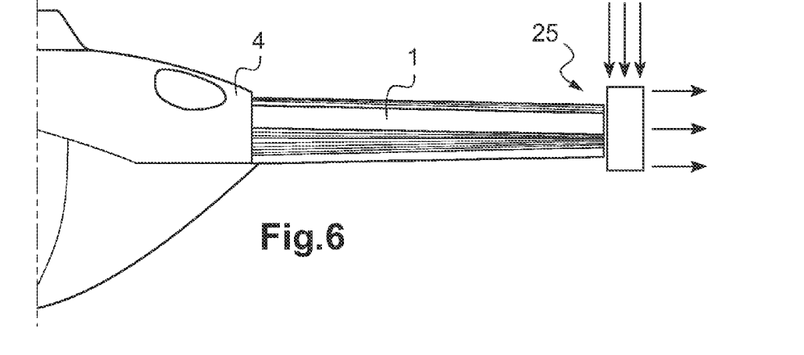
FIG. 6 shows a lateral view of a part of the helicopter with a modified cross flow fan according to the invention.

According to FIG. 6 corresponding features are referred to with the references of FIG. 1-5. A radial compressor 25 is provided at the compressor 1, distal to the fuselage 4. Said radial compressor 25 is driven by the rotating compressor 1 for the generation of forward propelling force thus providing a compound helicopter.

Figure 7:
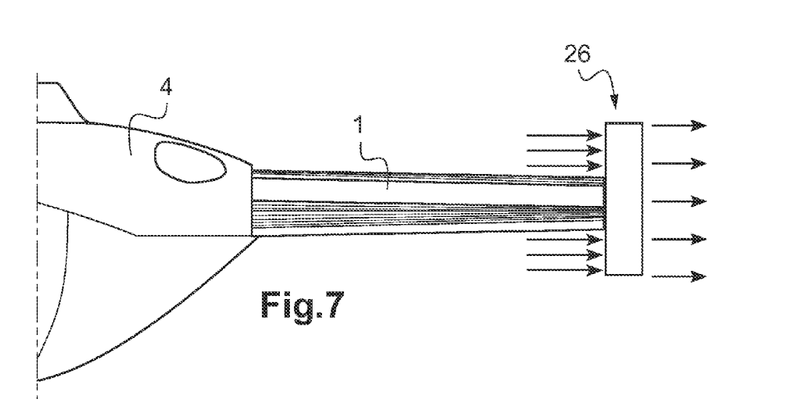
FIG. 7 shows a lateral view of a part of the helicopter with a further modified cross flow fan according to the invention.

According to FIG. 7 corresponding features are referred to with the references of FIG. 1-5. An impeller/ducted fan 26 is provided at the compressor 1, distal to the fuselage 4. Said impeller/ducted fan 26 is driven by the rotating compressor 1 for the generation of forward propelling force thus providing a compound helicopter.

Figure 8:
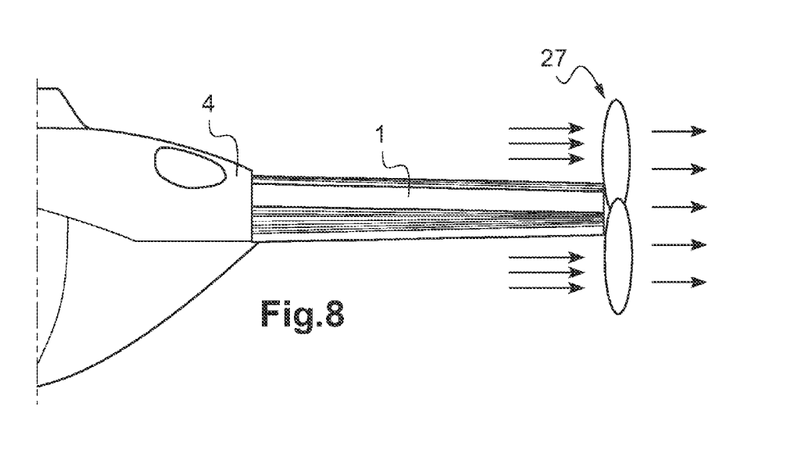
FIG. 8 shows a lateral view of a part of the helicopter with an alternative cross flow fan according to the invention.

According to FIG. 8 corresponding features are referred to with the references of FIG. 1-5. A propeller 27 is provided at the compressor 1, distal to the fuselage 4. Said propeller 27 is driven by the rotating compressor 1 for the generation of forward propelling force thus providing a compound helicopter.

REFERENCE LIST 1 compressor
2 housing
3 radial support rings
4 fuselage
5 fan axis
6 airfoil blades
7 outlet
8 inlet
9 Incoming fluid
10 Exiting fluid
11 Inlet region
12 Outlet region
13 yaw axis
14 Front section
15 Aft section
16 Mid-section
17 Side force vector due to the Coanda effect
18 Compressor diameter
19 Longitudinal extension
20 mid plane
21 flaps/hatches
22 Thrust vector
23 Roll axis
24 Multiple cross flow fans
25 Radial compressor
26 Axial compressor/impeller/ducted fan
27 Propeller
28 outside Flow
29 Foreign Object Damage (FOD) grid
30 Thrust vector
31 Yawing moment about the helicopter vertical axis (yawing axis)
32 Shaft
33 inside segment
34 outside segment
35 lateral inlet delimitation
36 lateral outlet delimitation

What is claimed is:

1. A helicopter comprising:
   a fuselage having a roll axis extending longitudinally, and at least one driving unit disposed in the fuselage;
   at least one main rotor mounted to the fuselage and drivable by the at least one driving unit to rotate about a yaw axis perpendicular to the roll axis;
   a cross-flow fan housing mounted to the fuselage extending essentially in the direction of the roll axis with an offset relative to the yaw axis; and
   an air inlet for incoming air and an air outlet for outgoing air are provided along at least a part of a circumference of the fan housing, the air inlet and the air outlet being formed by angularly offset and separate gaps between an inside segment and an outside segment essentially extending in the direction of the roll axis; and at least one rotatable compressor provided with a plurality of airfoil blades oriented radially about a fan axis inside the fan housing, the at least one rotatable compressor being drivable by the at least one driving unit;

wherein operation of the at least one rotatable compressor within the fan housing is configured to produce:
lift oriented from the air inlet in a lift direction opposite to a flow direction of the incoming air due to ingestion of the incoming air into the at least one rotatable compressor, and
lateral thrust oriented from the air outlet in a lateral thrust direction opposite to a flow direction of the outgoing air for anti-torque,
wherein the cross-flow fan housing is split into a front section, an aft section and a mid-section, the front section being closest to the yaw axis, the aft section being distal to the yaw axis and the mid-section being between the front section and the aft section, the front section, the aft section and the mid-section being separately and independently from each other pivotable about the fan axis.

2. The helicopter according to claim 1, wherein the inside segment and the outside segment of the fan housing are pivotable around the fan axis.

3. The helicopter according to claim 2, wherein remote control means are provided for remote control of an angular position of the inside segment and the outside segment of the housing.

4. The helicopter according to claim 1, wherein the air outlet has a diffusor shape.

5. The helicopter according to claim 1, wherein an output shaft is provided from a main gear box and the rotatable compressor is driven by the output shaft.

6. The helicopter according to claim 1, further comprising auxiliary forward propelling devices, wherein the rotatable compressor is adapted to drive the auxiliary forward propelling devices.

7. The helicopter according to claim 1, further comprising two cross-flow fans, each with the rotating compressor and cross-flow fan housing, the two cross-flow fans mounted parallel to each other and symmetric to a midplane on the fuselage.

8. The helicopter according to claim 1, wherein a width of the air inlet is greater than a width of the air outlet.

9. The helicopter according to claim 1, wherein the angular offset varies from 10° to 90° for an angle measured between a side from the fan axis to a lateral inlet delimitation of the air inlet and a side to a lateral outlet delimitation of the air outlet next to the lateral inlet delimitation of the air inlet.

10. The helicopter according to claim 1, wherein an angle about the fan axis from lateral inlet delimitations of the air inlet in an azimuth direction relative to the yaw axis vary for the lateral inlet delimitation between 350°+/−50° and between 10°+/−50° to the opposed lateral inlet delimitation with the yaw axis directed to the main rotor corresponding to 0° and the degrees positive in clockwise direction.

11. The helicopter according to claim 10, wherein an angle about the fan axis from lateral outlet delimitations of the air outlet in an azimuth direction relative to the yaw axis vary on the lateral outlet delimitation between 215°+/−50° and between 255°+/−50° to the opposed lateral outlet delimitation.

12. The helicopter according to claim 1, wherein the inside segment and outside segment have different lengths, the air inlet and air outlet.

13. A cross-flow fan for a helicopter having a fuselage extending lengthwise in a longitudinal direction and having a rotor rotating about a yaw axis being perpendicular to the longitudinal direction, the cross-flow fan comprising:
a fan housing adapted to be pivotally mounted to the fuselage and having a fan axis extending in the longitudinal direction,
a rotatable compressor provided inside the fan housing and having a plurality of airfoil blades extending radially from and rotating about the fan axis; and
an air inlet provided along a first part of a circumference of the fan housing and an air outlet provided along a second part of the circumference of the fan housing provided at an angular offset from the air inlet and;
wherein the fan housing pivots thereby changing an angular position of the air inlet and air outlet to produce:
lift oriented from the air inlet in a lift direction opposite to a flow of incoming air into the air inlet, and
lateral thrust oriented from the air outlet in a lateral thrust direction opposite to a flow of outgoing air from the air outlet for anti-torque,
wherein the cross-flow fan housing is split into a front section, an aft section and a mid-section, the front section being closest to the yaw axis, the aft section being distal to the yaw axis and the mid-section being between the front section and the aft section, the front section, the aft section and the mid-section being separately and independently from each other pivotable about the fan axis.

14. The cross-flow fan according to claim 13, wherein the fan housing includes an inside segment and an outside segment both disposed along the circumference of the fan housing and oriented between the air inlet and the air outlet to provide the angular offset, the outside segment having a circumferential length greater than the inside segment.

15. The cross-flow fan according to claim 13, wherein the angular position of the air inlet and air outlet is controllable remotely by pivoting the fan housing, thereby varying the lift direction and the lateral thrust direction.

16. The cross-flow fan according to claim 13, wherein the first part of the circumference that defines a width of the air inlet is greater than the second part of the circumference that defines a width of the air outlet.

17. The cross-flow fan according to claim 13, wherein the angular offset is not 180°.

18. A helicopter comprising:
a fuselage having a roll axis extending in a longitudinal direction,
at least one main rotor mounted to the fuselage to rotate about a yaw axis perpendicular to the roll axis;
a cross-flow fan housing pivotally mounted to the fuselage and having a fan axis extending in the longitudinal direction, the fan housing having a front section, an aft section and a mid section positioned longitudinally between the front section and the aft section, each of the aft section, the front section, and the mid section being pivotally mounted about the fan axis;
a rotatable compressor provided inside the fan housing and having a plurality of airfoil blades extending radially from and rotating about the fan axis; and
an air inlet and an air outlet extending longitudinally along each of the front section, aft section and mid section, wherein the air inlet is angularly offset along a circumference of the cross-flow fan housing from the air outlet, wherein angular positions of the air inlet and the air outlet of each of the aft section, the front section, and the mid section is adapted to be varied with respect to each other when each of the aft section, the front section, and the mid section are pivoted.

19. The helicopter according to claim 18, wherein the fan housing includes an inside segment and an outside segment both disposed along the circumference of the fan housing and oriented between the air inlet and the air outlet to provide the angular offset, the outside segment having a circumferential length greater than the inside segment.

* * * * *